Dec. 8, 1970  D. A. SAYLES  3,546,086
DEVICE FOR OXYGEN MEASUREMENT
Filed Oct. 30, 1968
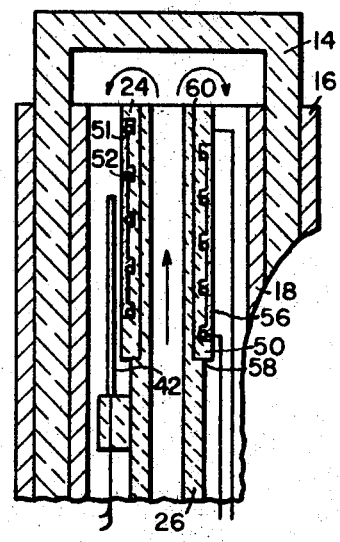
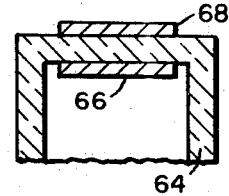
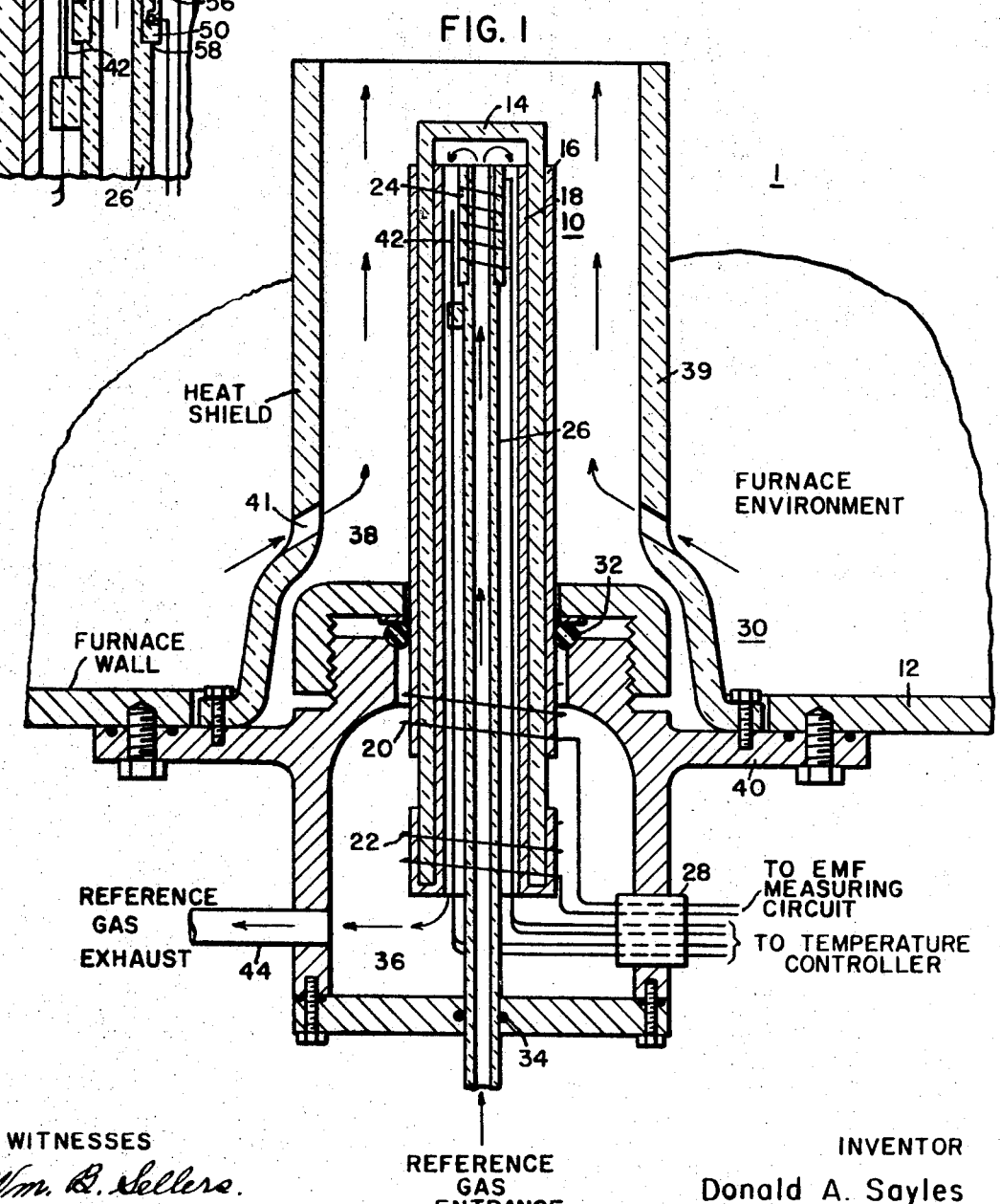
WITNESSES
Wm. B. Sellers
Michael P. Lynch
INVENTOR
Donald A. Sayles
BY
ATTORNEY United States Patent Office 3,546,086
Patented Dec. 8, 1970

3,546,086
DEVICE FOR OXYGEN MEASUREMENT
Donald A. Sayles, Pittsburgh, Pa., assignor to Westinghouse Electric Corporation, Pittsburgh, Pa., a corporation of Pennsylvania
Filed Oct. 30, 1968, Ser. No. 771,709
Int. Cl. G01n 27/46
U.S. Cl. 204—195
12 Claims

ABSTRACT OF THE DISCLOSURE

The invention is an improved solid state oxygen measuring electrochemical cell utilizing an internal heating element to establish the required cell operating temperature and provide an oxygen measuring system for in situ monitoring of the oxygen partial pressure of gases.

BACKGROUND OF THE INVENTION

Field of the invention

This invention relates in general to oxygen measuring devices and more particularly to a solid state oxygen gauge capable of direct in situ monitoring of gas constituents, such as oxygen.

Description of the prior art

To date there have been several solid state gas measuring devices developed which generate an EMF signal as a function of the oxygen concentration in an inert gas environment.

A device utilizing a tubular electrolyte with opposed electrodes located on the inner and outer surface of the electrolyte has recently been developed. The operation and structure of such a device is described in U.S. Pat. 3,347,767 to W. M. Hickam and assigned to the assignee of the present invention.

The tubular cell, while successfully operating in systems employing a gas bypass chamber or sampling system utilizing an external cell heater and temperature sensor, such a tubular cell has been ineffective in in-line gas monitoring applications.

The sampling system comprises small diameter tubing, a control valve and a flow meter for supplying the sample gas to the oxygen measuring device. In many applications there can be serious problems of plugging and corrosion of the sampling system due to moisture, dirt and corrosive constituents of the sample gas.

For determining the oxygen concentration by a conventional oxygen measuring cell in a system in which the total gas pressure at or below atmospheric pressure it is generally necessary to draw the sample gas into the sampling system utilizing a vacuum source.

The application of this oxygen cell generally requires the presence of a reference air environment surrounding the cell thus limiting the location of the oxygen measuring device.

The complexity and awkwardness of this oxygen measuring device resulting from the use of an external heating circuit, a sampling chamber, and in some instances a vacuum system severely limits the application of this device particularly in applications requiring in situ monitoring of sample gases.

SUMMARY

The invention is an oxygen monitoring system capable of in situ measurement of oxygen partial pressure incorporating a heater and temperature measuring device positioned within a solid electrolyte electrochemical cell in proximate relationship with electrodes which are disposed in direct contact with the electrolyte in opposed relationship on the inner and outer surfaces of the electrolyte.

The compact, integral electrochemical cell provided by positioning the heater and temperature sensor within the solid electrolyte permits direct exposure of the cell to gas environments the oxygen concentration of which is to be measured.

Electrochemical cell heating efficiency is improved by thermally shielding the cell.

While the heater is generally required to heat the cell to a temperature between 650° C. and 1000° C. to establish the desired cell ionic conductivity in response to changes in oxygen partial pressure, the heater may be eliminated when measuring a gas the temperature of which is of sufficient magnitude and stability to maintain the desired cell response. In the event the heater is eliminated the temperature sensor will function to measure the temperature of the gas environment.

The complexity of the solid electrochemical cell can be further reduced by substituting a sealed oxygen reference comprised of an intimate mixture of a metal-metal oxide in contact with the reference electrode surface thereby eliminating the need for a flowing reference gas.

DESCRIPTION OF THE DRAWING

FIG. 1 is a cross-sectional view of the preferred embodiment of the invention;

FIG. 2 is a partial cross-sectional view of a portion of the embodiment of FIG. 1.

FIG. 3 is a partial cross-sectional view of an alternate electrode configuration.

DESCRIPTION OF THE PREFERRED EMBODIMENT

There is illustrated in FIG. 1 an in situ application of an oxygen measuring apparatus 1 in a furnace environment defined by the furnace wall 12. The apparatus 1 is comprised of an oxygen measuring electrochemical cell device 10 and a housing member 30.

The device 10 comprises a tubular electrolyte member 14 of a solid material such as zirconium oxide which conducts oxygen ions with negligible electronic conductivity. A detailed discussion of suitable electrolyte materials is presented in the U.S. Pat. 3,400,054 to R. J. Ruka and J. Weissbart and assigned to the assignee of the present invention. Disposed on the outer surface of the tubular electrolyte member 14 in direct contact therewith is a first electronically conductive electrode 16. A second electronically conductive electrode 18 is disposed on the inner surface of the tubular electrolyte and a substantial portion of it directly opposes the outer electrode 16. The inner electrode 18 extends around the open end of the tubular electrolyte member 12 to permit secure attachment of an electrical lead. The electrodes 16 and 18 are of layers disposed in intimate contact with electrolyte surface and have electrical continuity but are sufficiently porous to permit gas reactance to reach the electrolyte.

Lead members 20 and 22 are disposed in conductive contact with the electrodes 16 and 18 respectively. The lead members 20 and 22 are of elongated members which are wrapped tightly around the electrode and make good electrical contact therewith. The electrode configuration illustrated and the selection of the wrapped lead members reflect a workable arrangement and is not to be considered a limitation of the invention.

The EMF voltage signal generated by the electrochemical cell 10 in response to changes in the oxygen partial pressure of a sample gas is transmitted by leads 20 and 22 through a suitable interconnect means 28 to a measuring circuit (not shown).

An electrolyte heater 24, illustrated as a resistance heating device, is secured to a ceramic gas entry tube 26 and maintained in a position adjacent to the electrodes 16 and 18 at a location near the closed end of the tubular electrolyte member 10. The heater 24 maintains this portion of the electrolyte member at a desired operating temperature between 650° C. and 1000° C. The relatively high operating temperature increases the ionic conductivity of the electrolyte 14. The electrical leads from the heater 24 extend through the open end of the electrolyte member 14 and exit the housing 30 through interconnect member 28 to a heater power supply (not shown).

In the event the temperature environment of the sample gas is stable and of sufficient magnitude to sustain the desired electrochemical cell response to changes in the oxygen partial pressure of the sample gas, the electrolyte heater may be eliminated. In such cases the temperature sensor can be utilized to monitor the temperature of the sample gas environment.

The oxygen measuring device 10 and the gas entry tube 26 are secured within the housing member 30 by suitable means such as O-ring seals 32 and 34 respectively.

The housing member 30 consists of isolated gas chambers 36 and 38. The embodiment illustrated in FIG. 1, depicts the oxygen measuring apparatus 1 as being mounted within a furnace by suitable flange means 40 thereby designating the housing chamber 36 the reference gas chamber and housing chamber 38 the sample gas chamber. It is noted that the rolls of the chambers 36 and 38 can be reversed and the sample gas introduced to the interior of the cell 10 and the reference gas circulated in chamber 38.

In operation the sample gas, the oxygen content of which is to be measured, enters the housing chamber 38 through an annular array of passages 41 and circulates by convection in contact with the surface of the electrode 16 and exists the chamber 38 through an open end of housing 30. While the arrows indicate a possible gas flow direction, it is apparent that the flow direction may be other than that illustrated.

The reference gas, typically air, comprising a known concentration of oxygen is supplied to the surface of the inner electrode 18 by the open ended entry tube 26. The entry tube is of a high temperature inert material such as aluminum oxide ceramic which will withstand the high operating temperature of the cell 10 and not react with the oxygen present in the reference gas.

The entry tube 26, in addition to functioning as a support for the heater 26 and electrolyte temperature sensing device 42, functions to isolate the cool reference gas from the active cell area until the reference gas has been heated by heater 24. The isolation of the reference gas from the electrochemical cell prior to heating eliminates thermal shock which might result in unstable erratic cell operation. The reference gas flow as depicted by the arrows exposes the inner electrode surface to the reference gas and the electrochemical cell responds to the differential oxygen pressure across the electrolyte 10 in the cell area heated by heater 24 and generates an EMF representative of differential oxygen pressure. The basic cell operation and resulting electrochemical reactions are described in detail in the above noted patent to W. M. Hickam.

In the event the flow of reference gas by convection is not sufficient, a suitable pumping system (not shown) may be provided. The reference gas passes through the reference chamber 36 after exiting the electrochemical cell 10 and is subsequently exhausted to the atmosphere through the exhaust tube 44.

While the cell 10 exhibits slight sensitivity to gas flow rate, the cell exhibits a marked sensitivity to changes in cell temperature. Therefore it is critical to maintain this cell at a constant desired operating temperature so as to render the cell output signals solely a function of the oxygen partial pressure of the sample gas.

The temperature sensor 42, which may be in the form of a platinum resistance thermometer, a thermocouple, thermistor, molten salt galvanic cell or other temperature responsive device capable of withstanding the cell operating temperature, is mounted to the ceramic entry tube 26 so as to position the active area of the sensor 42 adjacent to the heated portion of the cell 10. The leads of the temperature sensor 42 exit the housing member 30 through the interconnect 28 and are connected to a heater power supply control circuit (not shown). The molten salt galvanic cell represents a temperature sensor which generates an output signal which is directly proportional to temperature, thus eliminating the requirement for a linearizing circuit.

The positioning of the heater 24 and sensor 42 within the cell 10, in addition to producing a compact, portable electrochemical oxygen measuring device, it permits the use of low watt density heating due to the more efficient heating provided by internal heating as compared to the external heating generally utilized. To further improve the effectiveness of the internal heating the walls of the housing chamber 38 are constructed from a material which functions as a heat shield 39 and prevents heat loss to the sample gas environment. The heated environment within chamber 38 stimulates the circulation of gas by convention and thereby improves the operation of the electrochemical cell 10.

An enlarged partial view of the electrochemical cell 10 is illustrated in FIG. 2. The heater 24 is comprised of a mounting member 50 in the form of the tubular spool which is threaded to form a spiral groove 51 in the outer surface of the spool. The spool mounting member 50 is constructed from an inert material such as aluminum oxide ceramic which exhibits high temperature capability and high electrical resistivity. A resistance heater wire 52, such as the heater wire identified by the trade name Nichrome, is wound around the spool 50 and positioned within the spiral groove 51. The ceramic shoulder produced by the threading of the spool 50, in addition to providing an electrical isolation between adjacent coil turns, provides mechanical support for the heater configuration. The integrity of the heater assembly is further improved by applying a ceramic cement 56 of desirable heat transfer characteristics to the exposed surface of the heater wire 52 thus forming an encapsulated heater assembly 24.

The tubular heater assembly 24 is secured to the ceramic entry tube 26 by inserting the ceramic tube 26 into the heater assembly 24 and allowing the heater assembly 24 to seat on an annular shoulder surface 58 of the entry tube 26. A suitable ceramic cement 60 may be applied to the mating surfaces of the heater assembly 24 and the entry tube 26 to insure mechanical attachment therebetween. It is apparent that the combination of a separate heater assembly and a separate entry tube could be replaced by a single ceramic tube which functions as both a gas entry tube and a heater mounting member.

In certain applications of the oxygen measuring apparatus 1 the availability of air for the reference gas may be limited as in underground mine applications. In such cases the reference air may be eliminated and a sealed reference chamber containing an intimate mixture of a metal-metal oxide such as iron-iron oxide or copper-copper oxide substituted. The metal-metal oxide mixture exhibits a predictable oxygen partial pressure over a predetermined operating temperature range.

While the discussion has been directed toward the cell configuration in FIG. 1 in which the electrodes are disposed on the inner and outer surfaces of the electrolyte 14, this configuration represents but one embodiment.

In FIG. 3 there is illustrated a partial cross-sectional view of a closed end solid electrolyte 64 with opposed electrodes 66 and 68 disposed in direct contact with the inner and outer surfaces of the closed end respectively. This configuration represents the minimum vertical electrode dimension. This is desirable when the cell is installed and operated in a vertical configuration since the temperature gradient exhibited through this minimum dimension is considerably less than that exhibited by the electrode configuration of FIG. 1.

While the present invention has been shown and described in certain forms, it is apparent that various modifications may be made without departing from the spirit and scope thereof.

I claim:
1. Apparatus for providing an electrical signal indicativeof the oxygen partial pressure of a gas comprising:
   an electrochemical cell including an oxygen ion conductive electrolyte member,
   heater means inserted within said electrolyte member, and
   means for controlling the temperature of said electrolyte.
2. Apparatus in accordance with claim 1 further including a temperature sensing means positioned within said electrolyte member to monitor the temperature of the heated electrolyte.
3. Apparatus in accordance with claim 1 further including an open-ended gas entry tube inserted within said electrolyte member to introduce gas into the interior of said electrolyte.
4. Apparatus in accordance with claim 3 wherein said entry tube supports said heater means and said temperature sensing means.
5. Apparatus in accordance with claim 1 wherein said electrolyte member is a tubular member having a closed end and an open end and inner and outer electronically conductive electrodes in direct contact with the inner and outer surfaces of said electrolyte respectively, said electrodes disposed in direct opposition across the closed end of said electrolyte.
6. In a gas monitoring system, apparatus for in situ measurement of the oxygen partial pressure of a gas, said apparatus comprising:
   an electrochemical cell including an ion conductive solid electrolyte member having a cavity therein, a pair of electronically conductive electrodes disposed in direct contact with the electrolyte, one electrode with the inner surface and one electrode with the outer surface of said electrolyte, said electrodes disposed in direct opposition across said electrolyte member, a pair of conductive lead members in direct contact with said electrodes,
   heater means inserted within said electrolyte,
   means for regulating the temperature of said electrochemical cell,
   a housing structure within which said electrochemical cell is secured, said housing structure isolating the oxygen environment of said inner and outer electrodes and including means for locating said electrochemical cell within the gas environment to be monitored, and
   output means electrically coupled to said lead members, said output means responsive to the electrical signal developed across the electrodes of said electrochemical cell.
7. In a gas monitoring system as claimed in claim 6 including heat reflective means positioned adjacent to said electrochemical cell to improve the operating efficiency of the electrochemical cell.
8. In a gas monitoring system as claimed in claim 6 further including a temperature sensing means inserted within said electrolyte to monitor the temperature of the electrochemical cell environment.
9. In a gas monitoring system as claimed in claim 6 further including means for supplying the gas of unknown oxygen partial pressure to the surface of one of said electrodes, and means for providing a reference of known oxygen partial pressure to the surface of the other electrode.
10. In a gas monitoring system as claimed in claim 9 wherein said means for supplying a gas to the interior of the electrolyte member is an open-ended tube inserted within said electrolyte.
11. In a gas monitoring systm as claimed in claim 10 wherein said open-ended tube supports said heater means.
12. In a gas monitoring system as claimed in claim 9 wherein said oxygen reference is an intimate mixture of a metal-metal oxide, said metal-metal oxide mixture exhibiting a predictable oxygen partial pressure.

References Cited

UNITED STATES PATENTS

| | | | |
|---|---|---|---|
| 3,347,767 | 10/1967 | Hickam | 204—195 |
| 3,400,054 | 9/1968 | Ruka et al. | 204—1.1 |
| 3,464,008 | 8/1969 | Meysson et al. | 204—195 |
| 3,468,780 | 9/1969 | Fischer | 204—195 |

TA-HSUNG TUNG, Primary Examiner